Patented Dec. 26, 1950

2,535,189

UNITED STATES PATENT OFFICE 2,535,189

POLYMERIZING VINYL ACETATE IN GRANULAR FORM

Gwyn Benson and Robert L. Perks, Shawinigan Falls, Quebec, Canada, assignors to Shawinigan Chemicals Limited, Montreal, Quebec, Canada, a corporation of Canada No Drawing. Application May 23, 1949, Serial No. 94,932

9 Claims. (Cl. 260—89.1)

This invention relates to the manufacture of coarse grained vinyl ester polymers in suspension.

Crawford, in U. S. P. 2,194,354, disclosed the process of polymerizing vinyl esters in aqueous suspension, with the dispersion of monomer promoted by a colloid such as gum acacia, glycol cellulose, etc. It was found difficult to regulate this process so as to obtain coarse grained polymer without the dispersed phase settling prematurely or remaining permanently emulsified. Collins (U. S. P. 2,388,601) disclosed a process of polymerizing vinyl esters in suspension in aqueous medium containing hydrophillic non-ionizable colloidal dispersing agent and anionic surface-tension depressant, which process enable control to be maintained over the dispersion so that it did not settle prematurely nor remain permanently emulsified. It has also been found possible to polymerize vinyl acetate into polymer in granular form using a mixture of polyvinyl alcohols as emulsifying agent. (See, for example, U. S. appln. S. N. 795,119). The viscosities of the polyvinyl acetates from which these emulsifiers are derived are critical characteristics of the materials, as pointed out in the above mentioned application.

The granules or grains of polymer produced by these processes range in size from about 50 microns to about 500 microns diameter. Microscopic examination of the product shows that the particles are not all spherical, but that there are many irregularly shaped particles and lumps, the smaller of which appear to be fragmentary material in the granulated product. When a product containing irregular granules and fragmentary material is dried at moderate temperatures, in a vacuum oven or other conventional drying apparatus, it is found that the granules and fragmentary material sinter and fuse together to form a rigid and strongly cohesive agglomerated mass. The mass can be rendered to a free-flowing granulated product only with the utmost difficulty. In the manufacture of granular polymers on a commercial scale it is essential that the granules are capable of being dried quickly without fusing.

Objects

It is an object of this invention to provide a process for the polymerization of vinyl acetate in suspension in aqueous medium to produce coarse grained polymer particles that can be dried quickly and easily without the particles sintering or fusing together. This object and other advantages of the invention will be apparent from the following description thereof.

It has been discovered that desirable coarse grained spherical polymer particles of up to 900 microns diameter can be prepared by polymerizing vinyl acetate in suspension in aqueous medium containing, as emulsifying agent, one or more polyvinyl alcohols derived by the partial hydrolysis of polyvinyl acetate, and in addition, a dispersing agent of the type made by condensing sulfonic acids of aromatic hydrocarbons with formaldehyde and neutralizing to obtain a salt, said dispersing agent being one whose 1% aqueous solution has a surface tension of not less than about 50 dynes/cm. at 25° C. This type of dispersing agent may be made for example, by the procedures described for its manufacturer in U. S. Patents 2,046,757, 2,046,758, and 2,056,924. Polyvinyl alcohols suitable for the purposes of this invention are, for example, a polyvinyl alcohol that is derived from polyvinyl acetate having a viscosity of about 600–800 centipoises at 20° C. in a molar benzene solution and contains 15–30% acetate groups by weight calculated as polyvinyl acetate, or a polyvinyl alcohol that is derived from polyvinyl acetate having a viscosity of 2–15 centipoises at 20° C. in a molar benzene solution and contains 30–45% acetate groups by weight calculated as polyvinyl acetate, or a mixture of two polyvinyl alcohols, one of which is derived from polyvinyl acetate having a viscosity of 40–80 centipoises at 20° C. in a molar benzene solution and contains 5–20% acetate groups by weight calculated as polyvinyl acetate and the other is derived from polyvinyl acetate having a viscosity of 2–15 centipoises at 20° C. in a molar benzene solution and contains 20–50% acetate groups by weight calculated as polyvinyl acetate. The amount of polyvinyl alcohol emulsifier used is preferably in the range between 0.12 and 0.14% by weight of the total suspension of monomer and aqueous medium, and may be in the range between about 0.10% and 0.2%.

The additional dispersing agent required in the process of this invention is one of the type looked upon as derivatives of polyaryl alkyls or their homologues and may be expressed by the general graphical formula (A—R—A')SO₃M in which A and A' designate two or more aromatic groups— which may or may not be alike; which are joined to an aliphatic nucleus R which may consist of a single alkyl group or a plurality of alkyl groups associated in a straight chain or branched chain formation; and in which SO₃M designates at least one solubilizing group such as the free sulfonic acid group or the sulfonic acid group in connection with a soluble salt-forming radical. Specimens of this type of dispersing agent may conveniently be prepared by causing an aromatic sulfonic acid or a derivative thereof to react with formaldehyde or its equivalent preferably in the ratio of approximately two mols of the aromatic sulfonic acid for each mol of aldehyde. Examples of this type of dispersing agent are the polymerized sodium salts of alkylnaphthalene sulfonic acids sold under the trade name "Darvan No. 1" by R. T. Vanderbilt Co. Other examples of suitable additional dispersing agents are the materials sold by Dewey and Almy Chemical Company under the trade name "Daxad" and the material sold by Rohm and Haas Company under the trade name "Triton R-100" in the United States and under the trade name "Tamol" in Canada. The suitability of any one of these materials is, as previously mentioned, subject to the restriction that its 1% aqueous solution must have a surface tension of not less than about 50 dynes/cm. This criterion is necessary in order not to destroy the balance of the emulsifying action provided by the polyvinyl alcohol or mixture of polyvinyl alcohols. The more highly alkylated aromatic sulfonic acid derivatives are not suitable for the purposes of this invention if they do not meet the above criterion. The dispersing agents of this invention are thus not substitutes for, nor equivalents of, the surface-tension depressants used in combination with colloidal hydrophilic emulsifying material by Collins in U. S. P. 2,588,601.

No attempt is herein made to explain the action of a dispersing agent which does not appreciably lower the surface tension of water, but it is known that dispersing agents which do lower the surface tension of water considerably, i. e. act as wetting agents as well as dispersing agents, are unsuitable for the purpose of this invention. The amount of dispersing agent required for purposes of this invention ranges from about 0.05% to about 1.0% by weight of the total suspension of monomer and aqueous medium, with 0.2% to 0.5% as the preferred percentage.

It can be shown that the interfacial tension between vinyl acetate and a dilute aqueous solution of polyvinyl alcohol is only slightly increased by the addition to the aqueous phase of amounts of "Darvan No. 1" of less than one percent. The increase does not go beyond a very low maximum, hence the lyophilic-hydrophobic balance of the emulsifier (polyvinyl alcohol) is not destroyed by the dispersing agent (Darvan No. 1). Numerous other dispersing agents are found to increase greatly the interfacial tension between vinyl acetate and dilute aqueous solutions of polyvinyl alcohol, and hence are unsuitable for the purposes of this invention.

The granules of polymer produced by the process of this invention contrast markedly in their physical form or shape with the granules of polymer produced by the processes of the prior art. Polymer granules heretofore produced have been highly irregular in shape and have had rough irregular surfaces. The polymer granules produced by the process of this invention are generally spherical and smooth surfaced. These smooth round granules can be quickly and easily dried without sintering to a strongly cohesive mass of granules.

The following comparison illustrates the difference between the granules produced by the process of the present invention and the granules produced by a process of the prior art.

300 lb. vinyl acetate were polymerized in suspension under agitation in about 300 lb. aqueous medium containing: 0.96 lb. of a mixture of water-soluble polyvinyl alcohols as emulsifying agent, one being derived from a polyvinyl acetate having a viscosity of 60 centipoises at 20° C. in a molar benzene solution and containing 10% residual acetate groups by weight calculated as polyvinyl acetate and the other being derived from polyvinyl acetate having a viscosity of 7 centipoises at 20° C. in a molar benzene solution and containing 35% acetate groups by weight calculated as polyvinyl acetate, the weight ratio of the two polyvinyl alcohols being about 3:1, 150 grams of sodium bicarbonate as accelerating agent; and 60 cc. of a 27% solution of hydrogen peroxide as catalyst. The resulting granules of polymer were dried under a vacuum of 27 inches of mercury in a steam oven operating at 4 lb. gauge pressure. Over three hours drying time was required to dry the granules to less than 0.5% moisture content. During the drying period the granules fused to a rigid mass and had to be mechanically broken apart by crushing to obtain a free flowing granulated product. After using a swing-hammer mill type commercial crusher to crush a sample of the rigid mass, the time required to crush 1000 lb. of the sintered granules was calculated as 100 hrs.

A similar charge of 300 lb. vinyl acetate was polymerized in suspension under identical conditions with the exception that the aqueous medium contained 0.31%, by weight of the total suspension, of the polymerized sodium salts of alkyl naphthalene sulfonic acid, sold commercially as "Darvan No. 1" by the R. T. Vanderbilt Co. The polymer granules were dried under identical conditions to the previous batch, and required less than 1½ hours drying time to reach a moisture content of less than 0.5%. During the drying period the granules aggregated to a rigid but readily friable mass. The time required to reduce 1000 lb. of these granules to a free flowing granulated product in a commercial swing-hammer mill was found to be 10 hours. Thus the addition of the dispersing agent to the polymerization process affected this final product so that it could be dried in less than half the time formerly required, and processed in a crusher in one-tenth of the time.

Another batch of polymer granules prepared and dried in the same manner outlined above, except for the use of a slightly different polyvinyl alcohol emulsifying agent, namely one derived from a polyvinyl acetate having a viscosity of about 800 centipoises at 20° C. in a molar benzene solution and containing about 25% acetate groups by weight calculated as polyvinyl acetate, and 0.10%, by weight of the total suspension, of "Darvan No. 1" dispersing agent, gave granules which could be crushed to a free-flowing granulated product at the rate of 1000 lb. in two hours.

As previously stated, this invention comprises a process of polymerizing vinyl esters in suspension in aqueous medium containing polyvinyl alcohol emulsifying agent and an anion-active dispersing agent that does not act as a wetting agent, i. e. does not lower the surface tension of the aqueous medium more than a minor amount. The preferred dispersing agent is the sodium salt of the material made by condensing beta-naphthalene sulfonic acid with formaldehyde. However, any of the commercial anion-active dispersing agents made by condensing aromatic sulfonic acids with formaldehyde and neutralizing to obtain a salt, such as the materials sold under the trade names "Daxad," "Tamol," "TritonR-100," may be used, providing the 1% aqueous solution of the agent has a surface tension greater than about 50 dynes/cm. The amount of such dispersing agent required in the aqueous suspension varies with the specific agent used, but usually comprises about 0.05% to about 1.0% of the total suspension.

What is claimed is:

1. A process for preparing polyvinyl acetate in granular form which comprises (A) dispersing vinyl acetate in an aqueous medium containing, (1) as emulsifying agent, a material of the group consisting of (a) a polyvinyl alcohol that is derived from polyvinyl acetate having a viscosity of about 600–800 centipoises at 20° C. in a molar benzene solution and contains 15–30% acetate groups by weight calculated as polyvinyl acetate, (b) a polyvinyl alcohol that is derived from polyvinyl acetate having a viscosity of 2–15 centipoises at 20° C. in a molar benzene solution and contains 30–45% acetate groups by weight calculated as polyvinyl acetate, (c) a mixture of two polyvinyl alcohols, one of which is derived from polyvinyl acetate having a viscosity of 40–80 centipoises at 20° C. in a molar benzene solution and contains 5–20% acetate groups by weight calculated as polyvinyl acetate and the other is derived from polyvinyl acetate having a viscosity of 2–15 centipoises at 20° C. in a molar benzene solution and contains 20–50% acetate groups by weight calculated as polyvinyl acetate, (2) a peroxide polymerization catalyst, and (3) 0.05% to 1.0%, by weight of the total dispersion of vinyl acetate and aqueous medium, of a dispersing agent of the group of dispersing agents made by condensing sulfonic acids of aromatic hydrocarbons with formaldehyde and neutralizing to obtain a salt, said dispersing agent being one whose 1% aqueous solution has a surface tension of not less than about 50 dynes/cm. at 25° C., (B) heating and agitating the resulting mixture to polymerize the vinyl acetate, and (c) recovering the resulting granular polyvinyl acetate.

2. A process, as claimed in claim 1, in which the emulsifying agent is a polyvinyl alcohol derived from polyvinyl acetate having a viscosity of about 800 centipoises at 20° C. in molar benzene solution and containing 20% acetate groups by weight calculated as polyvinyl acetate.

3. A process, as claimed in claim 2, in which the amount of polyvinyl alcohol used is within the range from 0.12% to 0.14% by weight of the total suspension of vinyl acetate monomer and aqueous medium.

4. A process, as claimed in claim 3, in which the dispersing agent is a condensation product of formaldehyde with an alkylated naphthalene sulfonic acid.

5. A process, as claimed in claim 4, in which the amount of dispersing agent used is within the range from 0.2% to 0.5% by weight of the total suspension.

6. A process, as claimed in claim 1, in which the emulsifying agent is a mixture of two polyvinyl alcohols, one being derived from a polyvinyl acetate having a viscosity of 60 centipoises at 20° C. in a molar benzene solution and containing 10% residual acetate groups by weight calculated as polyvinyl acetate, and the other being derived from polyvinyl acetate having a viscosity of 7 centipoises at 20° C. in a molar benzene solution and containing 35% acetate groups by weight calculated as polyvinyl acetate.

7. A process, as claimed in claim 6, in which the amount of the two polyvinyl alcohols is within the range from 0.12% to 0.14% by weight of the total suspension.

8. A process as claimed in claim 7, in which the dispersing agent is a condensation product of formaldehyde with an alkylated naphthalene sulfonic acid.

9. A process as claimed in claim 8, in which the amount of dispersing agent used is within the range from 0.2% to 0.5% by weight of the total suspension.

GWYN BENSON.
ROBERT L. PERKS.

REFERENCES CITED

The following references are of record in the file of this patent:

UNITED STATES PATENTS

| Number | Name | Date |
|---|---|---|
| 2,388,600 | Collins | Nov. 6, 1945 |
| 2,418,782 | Mark et al. | Apr. 8, 1947 |

FOREIGN PATENTS

| Number | Country | Date |
|---|---|---|
| 475,162 | Great Britain | Nov. 12, 1937 |